Oct. 20, 1953  W. G. HODSON ET AL  2,656,523
TELEMETERING SYSTEM

Filed Jan. 11, 1951

INVENTORS:
WALDO G. HODSON
WALTER E. PETERSON

By Herbert E. Metcalf
THEIR PATENT ATTORNEY

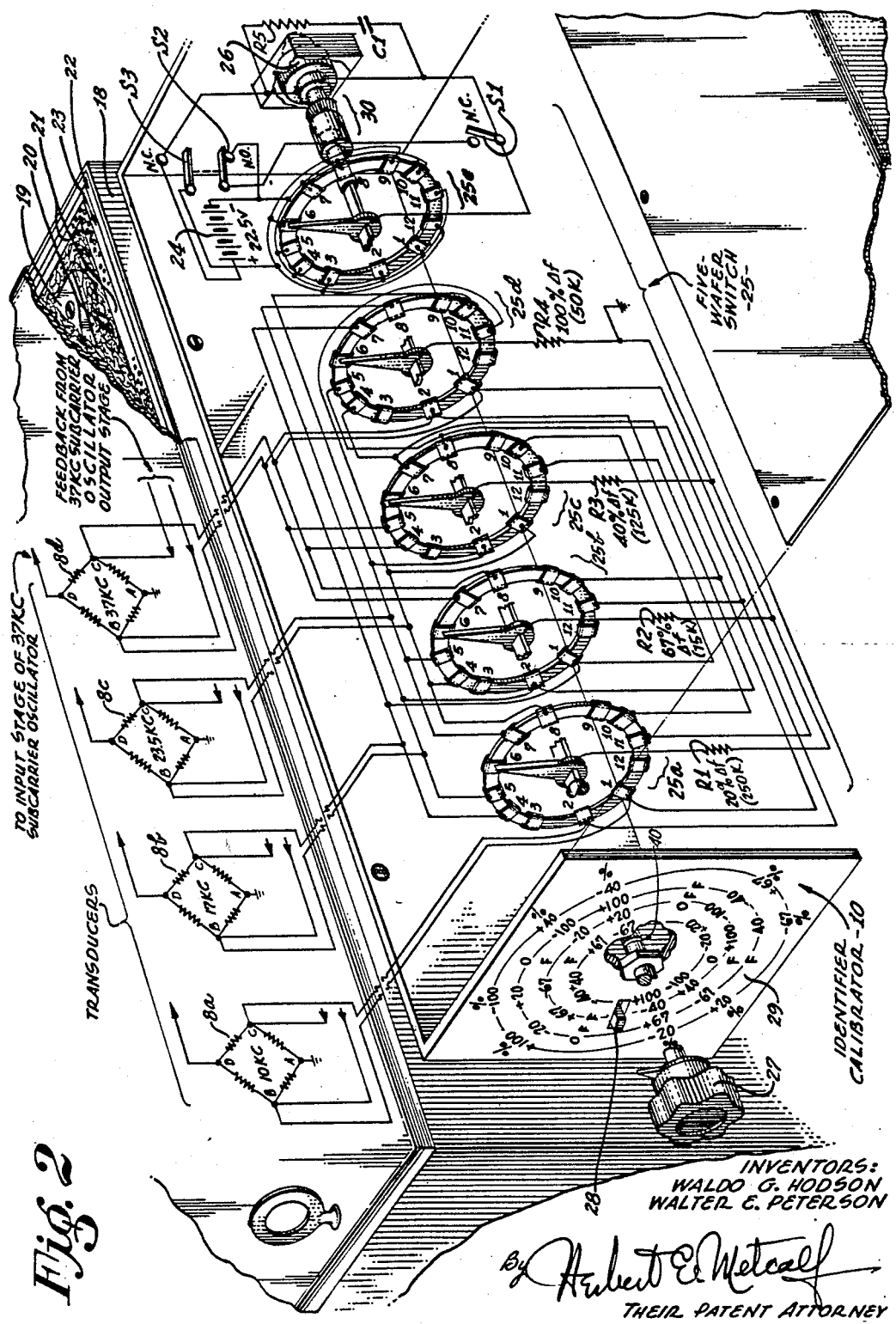

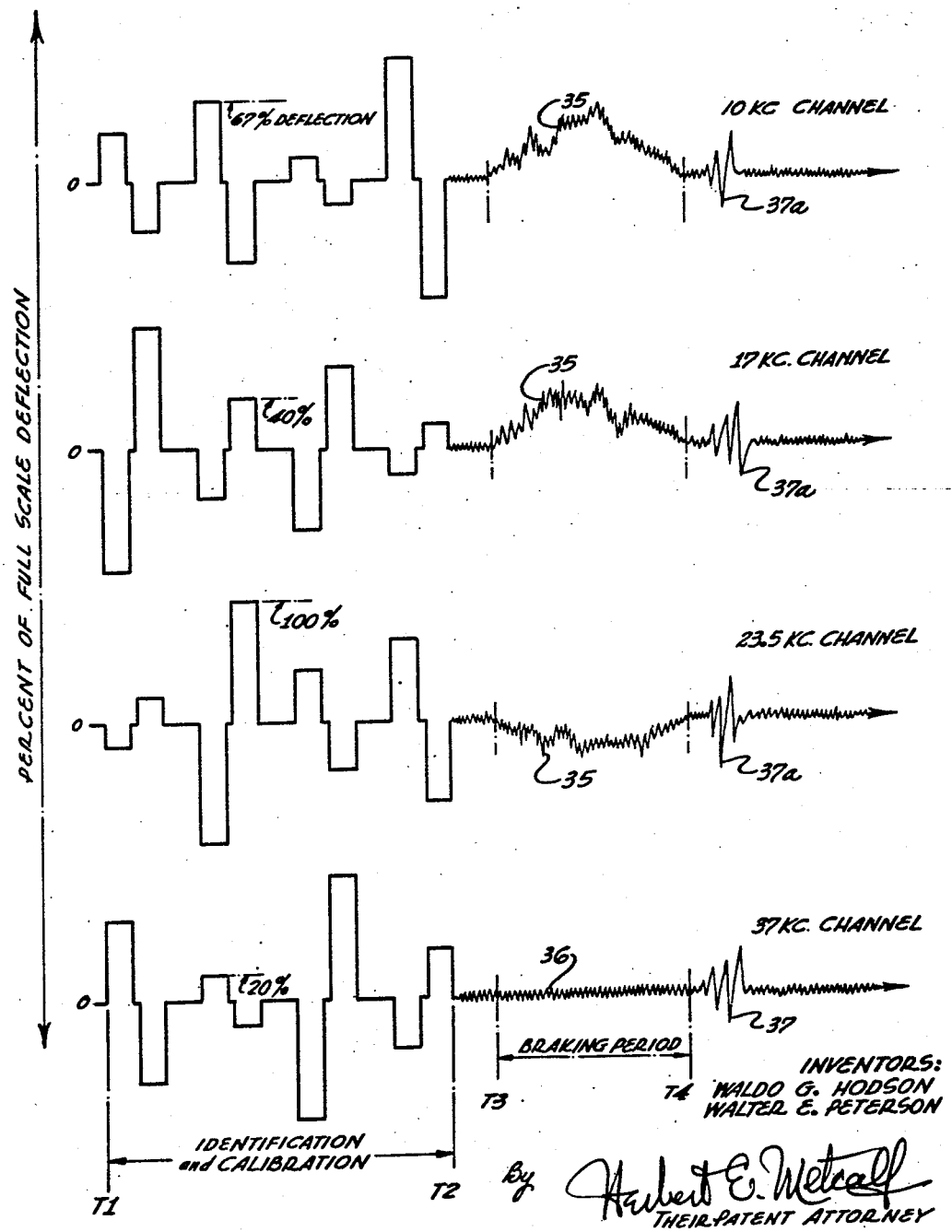

Patented Oct. 20, 1953

2,656,523

UNITED STATES PATENT OFFICE 2,656,523

TELEMETERING SYSTEM

Waldo G. Hodson, Burbank, and Walter E. Peterson, Los Angeles, Calif., assignors to Northrop Aircraft, Inc., Hawthorne, Calif., a corporation of California Application January 11, 1951, Serial No. 205,512

18 Claims. (Cl. 340—183)

This invention relates to telemeters, and more particularly to a new and novel telemetering system. The invention is particularly adapted to meter and record short period, high gravity-unit accelerations, such as encountered in the complete run of a rocket-propelled sled along a straight stretch of rail track, for example.

If a vehicle is propelled by rockets along a relatively short track at high speed and then quickly brought to a halt near the end of the run for test purposes, different parts of the vehicle and equipment carried on board, either rigidly or shock-mounted, such as personnel, are subjected to various severe stresses. It is desirable to know what stresses the different parts are subjected to and the magnitude of the deceleration, particularly during the short interval of time of maximum deceleration in stopping.

The magnitude of deceleration may be of the order of 100 gravity-units acting within a time-period of less than 0.2 second, for example, in the above mentioned vehicle runs. The associated violent shock and accompanying large amplitude vibrations together with the prevailing high acoustic noise level has contributed detrimental effects to the action of present telemeters.

Thus, it is an object of this invention to provide means capable of producing intelligible and accurate measurements of short period and large scale accelerations for transmittal and recording from a high speed vehicle to a fixed station.

It is another object of the invention to provide means and method for the calibration and identification of various data transmitted from a stationary or moving vehicle to remote recording equipment.

Another object of the invention is to include means and method for detection of intrinsic systematic variation or malfunction, and of other extraneous effects on a telemetering system which may appear in the output.

A further object of the invention, requisite to the successful operation of a telemetering system, is a provision of adequately shock cushioned mobile equipment.

The foregoing objects are accomplished, briefly, by employing a multi-channel FM-AM radio link between sled and ground which consists of a carrier that is amplitude modulated by several subcarriers. The subcarriers in turn are frequently modulated by information transducers. In addition, an identifier-calibrator unit periodically shunts in sequence different valued resistors across the transducers, preferably just prior to the telemetering period, and produces a series of known square waves, which appear in the output traces. The transmitted carrier-signal is received and detected to produce the several frequency modulated subcarriers. The receiver output is fed to the inputs of several demodulator channels, each of which is tuned to accept one of the subcarrier frequencies and to reject all other frequencies. The demodulator channels thus separate the frequency modulated subcarriers and convert them into D. C. currents of sufficient magnitudes to drive the galvanometers of a recording oscillograph.

The subcarrier oscillators which produce the aforementioned subcarriers are fully shown, described and claimed in a companion application, Serial No. 187,981, filed October 2, 1950. Similarly, a suitable demodulator for use as a component of the present system is also fully shown, described and claimed in another companion application, Serial No. 207,037, filed January 20, 1951.

Dummy transducers, i. e., non-variable transducers, placed in some of the subcarrier channels will provide a check on the output traces, giving evidence of any spurious signals. However, the large accelerations being measured still demand effective shock absorption. The mobile equipment is all carefully shock mounted and the subcarrier oscillator units and modulator are floated in an outer case by a layer of rubberized bristle and foam rubber pads. The inner sides of the outer case are further coated with a heavy, sound absorbing compound.

The invention possesses numerous other objects and features, some of which, together with the foregoing, will be set forth in the following description of a preferred embodiment of the invention, and the invention will be more fully understood by reference to the following attached drawings, in which:

Figure 2 is a combination schematic wiring diagram and partial perspective view of the identifier-calibrator unit. A portion of the damping and isolation system is included in the perspective view.

Figure 3 is a diagram of a set of waveforms illustrating the trace characteristics of the identifier-calibrator. Typical braking waves are also shown.

Figure 1:
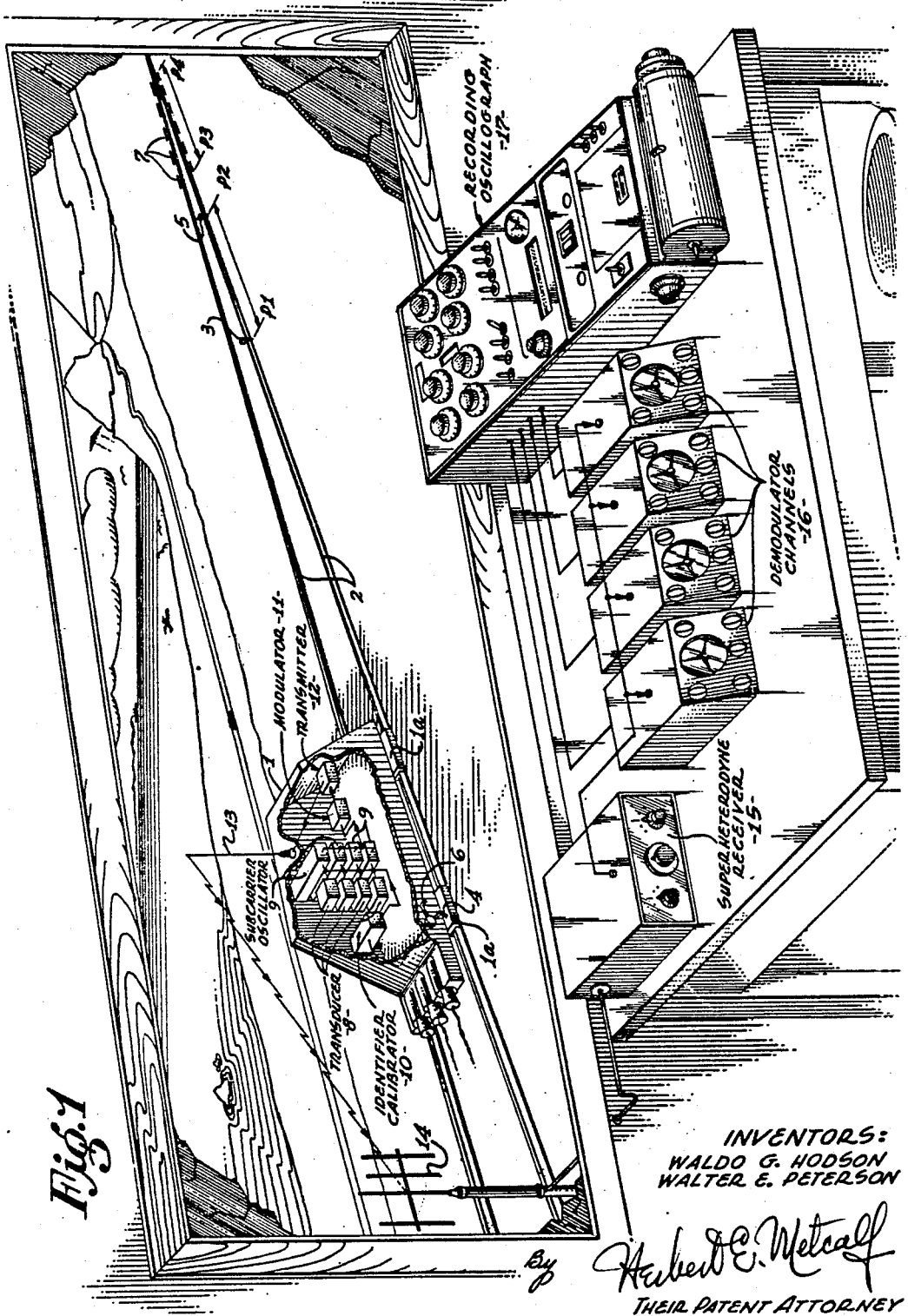
Figure 1 is a perspective view of a high speed sled telemetering data to a remote fixed station, showing in block diagram form a preferred four-channel telemetering system in accordance with this invention.

Reference is first made to Figure 1. A high speed rocket-propelled sled 1 runs on slippers 1a along the rails of a track 2 approximately 2000 feet in length. At point P1 on the track, an arm 3 beside the track engages a lever 4 on the moving sled which starts the identification and calibration process. After at least a full cycle of trace is transmitted and recorded for each channel, as will be described in full later, the sled will arrive at P2 where another track arm 5 engages another lever 6 on the sled to stop identification and calibration, and leave the telemetering equipment in condition for transmission of desired information. The time interval from P1 to P2 for this stage does not exceed 1 second, for example.

Identification and calibration is concluded just before the sled enters the braking stretch of maximum deceleration between P3 and P4 of the track. Braking action is performed by a series of clamps 7, which grip brake rails (not shown) on the sled to stop it.

The transmitting system, or mobile equipment, includes four transducers 8 (resistance type accelerometers), which sense the accelerations that are to be telemetered and convert them into resistance variations, which will cause corresponding variations in the frequencies of four corresponding subcarrier oscillators 9. An identifier-calibrator unit 10 periodically shifts the frequencies of the subcarrier oscillators by predetermined amounts to provide standards for calibration, during the time interval from P1 to P2. The outputs of the subcarrier oscillators (nominally 10, 17, 23.5 and 37 kc. in the preferred example) are mixed in a common network and fed to a modulator 11 which is comprised of a split-phase driver stage, resistance-capacity coupled to a push-pull amplifier. This unit amplitude modulates, with signal voltages from the subcarrier oscillators, a 219.45 mc. carrier which is generated by a five-stage R.-F. transmitter 12. The resulting signal is radiated by an antenna 13 to the recording station. The antenna 13 consists of a single, base-fed, quarter wave element mounted on top of the rocket driven vehicle, and the structure of the vehicle serves as a ground plane. A battery power supply (not shown) for the transmitter and subcarrier oscillator units is also carried on board.

A receiving antenna 14 which receives the radiated signal is a directional, rotatable, Yagi antenna with one driven element, two directors and one reflector. It is connected to an R.-F. superheterodyne receiver 15 which utilizes a degenerative output circuit to match the impedance of the receiver detector stage with the input impedance of four demodulator channels 16.

The receiver output is fed to the inputs of all the demodulator channels. Each demodulator channel 16 consists of a selector which is tuned to accept only one of the subcarrier frequencies, a limiter which converts the selector output into a square wave voltage of constant amplitude, a converter stage which differentiates the limiter output using the resulting wave to control the peak amplitude of a saw-tooth voltage generated in this stage, a clamper-detector which produces a D. C. voltage proportional to the peak amplitude of the saw-tooth, and a paraphase D. C. amplifier to supply a dual D. C. output to the grids of a push-pull driver which drives the galvanometers in a recording oscillograph 17. The demodulator power supply (not shown) provides regulated voltages for the demodulator channels.

The high quality oscillograph 17 utilizes galvanometers having an impedance in the order of 8 ohms with the preferred equipment. A separate galvanometer and attached mirror is driven by the output of each demodulator channel, thus deflecting a light beam which falls on photo-sensitive paper or film driven at a constant speed.

The transducers are the end organs which pick up the intelligence to be telemetered and convert it into electrical variations. Generally, they are placed at strategic locations in order to measure various accelerations, for example, of vertical and horizontal displacements. For the four-channel telemeter under discussion, three transducers can be placed to measure the vertical, fore-and-aft, and lateral components of acceleration of a main structure of the sled. The other remaining transducer is replaced by a dummy or inactive transducer which consists of four fixed, precision resistors arranged in a Wheatstone bridge, and provides a check on the effects of vibration and other disturbances on the operation of the system. The identifier-calibrator unit 10, which is essentially a motor-driven switching device for shunting an appropriate resistor across one arm of a transducer bridge so as to produce a desired magnitude of trace deflection, is shown in further detail in Figure 2.

The identifier-calibrator unit is shown mounted to one end of a container 18 which houses an inner case 19 carrying the subcarrier oscillators 9 and modulator 11. It is noted at this time the elaborate damping system applied to cushion the subcarrier oscillators and the modulator. Isolation from external disturbances is achieved by surrounding the inner case 19 by an inch thick layer of rubberized bristle 20, which is sufficiently resilient to filter out most of the high frequency mechanical vibrations. Foam rubber pads 21 are placed in each end of the outer container 18 to prevent bottoming of the inner case 19. A thick coating of sound absorbing adhesive compound 22 is applied to the inside of the container 18. To the adhesive compound 22 is attached a layer of felt 23. Flexible leads (not shown) connect the inner case with outside circuits.

The transducer bridges 8a, 8b, 8c and 8d corresponding to the 10, 17, 23.5 and 37 kc. channels of the telemeter, are shown in the schematic of the identifier-calibrator circuit in order to clearly describe the action of the switching unit. These transducers may be active or inactive.

It has been mentioned in the description of the telemetered run of the high speed rocket-propelled sled 1, that the arm 3 beside the track 2 engages the lever 4 on the sled to start the identification and calibration process. Actuation of the lever 4 on the sled closes a switch S1 (Figure 2) connecting a 22.5 volt battery 24 to start a D. C. drive motor 26. The motor 26 drives the rotors of a five wafer switch 25 through a drive coupling 30. These rotors make wiping contact with twelve terminals on each wafer. Four resistors, R1, R2, R3 and R4 of differing resistances 250K, 75K, 125K and 50K, respectively, are grounded together on one end and connected each to the rotors of wafers 25a, 25b, 25c and 25d on the other. The wiring is connected from the switch terminals across the four transducer bridges 8a, 8b, 8c and 8d such that the resistors are shunted across an arm of each transducer in cyclic sequence as the rotors are rotated. The result is to unbalance the bridges in sequence, and a multi-valued set of square waves, including both positive and negative pulses, is generated in a different positive and negative pulse sequence for each channel. The switch 25 can be connected in various other ways to produce a variety of suitable pulse waves.

Just before the sled 1 enters the brakes, the other arm 5 along the track engages the second lever 6 on the sled performing the following function. Switch S2 (Figure 2) is opened and switch S3 is closed at the same time. The last wafer 25e of switch 25 is wired such that the drive motor 26 is dynamically braked to stop only on an "off" (zero-deflection) position of the identifier-calibrator unit 10 when switches S2 and S3 are thus operated. This leaves the transducers 8 ready for detection of data during the braking distance P3—P4 immediately following. A series combination of resistor R5 and condenser C1 is placed across the armature of drive motor 26 to reduce interference on the system due to sparking at the brushes on the commutator.

The identifier-calibrator unit 10 can be operated manually by pulling an index knob 27 outwardly and moving a slide clip 28 toward the switch shaft. This disengages the D. C. motor drive 30, and holds it disengaged by means of a groove 40 in the shaft with which a leg (not shown) on the clip 28 makes contact. Manual rotation of the knob 27 will produce identifying and calibration waves as desired. A dial 29 indicates the percent of full scale deflection in each channel for various positions of the index knob 27, the 10 kc. channel being read on the outer circle of the dial, the 17 kc. channel on the next inner circle and so on. Thus, calibration and identification of the various channels either prior to a run or during one is easily provided by the equipment. By comparing the static and dynamic calibration, the fidelity of the system in motion can be confirmed.

As the rotary switch 25 above described is used to shunt the 250K, 125K, 75K and 50K resistors respectively across each transducer, the choice of resistances give 20%, 40%, 67% and 100% of full scale deflection in each channel. The typical trace characteristics are shown in Figure 3 in the section from time T1 to T2 (identification and calibration period), representing time during travel between P1 and P2 along the track on which the rocket-propelled sled runs. The sequence of positive and negative pulse deflection identifies the several channels, and an adequate spread of percent of full scale deflection is provided for accurate calibration of measured data. Full scale deflection is equivalent to an acceleration 100 times that of gravity, for example.

The sled enters the brakes at time T3 (corresponding to travel P3) and is stopped at time T4. The measured decelerations are represented by the traces 35 (Figure 3) in the 10 kc., and 23.5 kc. channels, assuming three active transducers are employed in these channels. The braking traces 35 presented by these channels are continuously fluctuating indicating the sensitive high frequency response of the system. The effective, main force of the deceleration is given by the curve upon which the small oscillations are superimposed.

A dummy transducer placed in the 37 kc. channel presents a relatively straight, even line 36. At the end of the braking period, after time T4, the dummy channel produces a strongly varying trace 37 and finally returns to normal. This also occurs in the other three channels. The function and purpose of a dummy transducer is clearly illustrated by this example, and points to the necessity for them, as will now be further explained.

The braking trace 35 may be interpreted as satisfactory functioning of the system until the sled is fully stopped, and at such instance, possible vibratory reaction of systematic overload results in the transient fluctuation 37. If such a variation occurred only in the dummy channel, it would be evidence of malfunction of that particular channel only. However, when similar variations 37a occur during the same interval of data measurement, that portion of disrupted trace must be disregarded, since probably the cause of such variations lies in the modulator or transmitter. More than one channel can be installed with dummy transducers. This practice insures detection of improper indication, particularly at the interval of peak acceleration when systematic variation cannot be easily distinguished from very high accelerations.

The preferred equipment is capable of excellent high frequency response and will record 63 percent of the maximum amplitude of a square wave input in less than 0.0025 second, for example. The overall accuracy with calibration curves is within 5 percent of error for all channels. Even without the use of calibration curves, the non-linearity of the system produces an overall accuracy average of less than 9 percent error for all channels with the present equipment. However, these figures are not to be construed as performance limitations since error of the various components, including simple resistors, the transducers, the recording oscillograph, and any non-linearity due to system construction are all subject to wide variations. They are merely indicative of the high accuracy achieved with this invention in measuring very large accelerations which heretofore are not known to have been satisfactorily metered.

Thus, it may be stated that the present invention and its high frequency response of the order of 500 C. P. S., and which is capable of metering and recording accelerations as high as 100 gravity-units within an overall accuracy of 5 percent error, far outdistances the performance of prior art devices. In addition to superiority of performance and accuracy, there are provided the novel features of an identification and calibration method and means which may be operated manually or automatically prior to a run or during one, respectively. Dummy transducers are provided to monitor the data to give an account of intrinsic systematic variation or malfunction.

Although the present invention is especially adapted to meter and record accelerations, it can be equally well used to telemeter any other data that is sensed by an end instrument having a variable resistance output.

From the above description it will be apparent that there is thus provided a device of the character described possessing the particular features of advantage before enumerated as desirable, but which obviously is susceptible to modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In a radio telemetering system for transmitting data from a vehicle to a remote receiving station, the combination of means producing a single transmitter carrier wave from said vehicle, a plurality of subcarrier channels each connected to simultaneously feed a portion of said data into said carrier producing means for simultaneous modulation thereof by all of said data from said subcarrier channels, and identifying and calibrating means adapted to be connected into said subcarrier channels as and when desired, said identifying and calibrating means arranged to produce a different predetermined series of sequential signals in each of said subcarrier channels, whereby each channel can be easily identified at the output of said system and furnished with calibration information for determining the true value of the data fed from each of said subcarrier channels.

2. In a radio telemetering system for transmitting data from a vehicle to a remote receiving station, the combination of means producing a single transmitted carrier wave from said vehicle, a plurality of subcarrier channels each having a different operating frequency and connected to feed a portion of said data into said carrier producing means for separable modulation thereof, an information transducer in each of said subcarrier channels connected to produce an electrical signal representative of a certain variable condition making up said portion of data, and channel identifying and calibrating means comprising a plurality of different valued electrical components each adapted to be momentarily shunted across any of said transducers to produce a predetermined variation of output of said transducers in the form of a pulse, and switching means connected to progressively shunt each of said electrical components across each of said transducers in a predetermined order, when actuated, so as to produce a cycle of pulses in the output of each of said subcarrier channels, which cycle is peculiar to a designated one, only, of said transducers for channel identification, the values of said electrical components being each designed to give a respective pulse characteristic corresponding to a known value of the desired data to be transmitted from said transducers, whereby the transmitted data arriving at said receiving station when said switching means is non-actuated can be accurately calibrated throughout the entire range of operation.

3. Apparatus in accordance with claim 2 wherein said electrical components are four resistors having the proper respective values to give output pulse amplitudes corresponding to approximately 25%, 50%, 75% and 100% full scale deflection of each of said transducers when respectively shunted across said transducers.

4. Apparatus in accordance with claim 2 wherein said identifying and calibrating means is positioned on said vehicle, and including manual control means for actuating said switching means to any position when desired, and wherein switch actuating and de-actuating means is provided to produce at least one cycle of said output pulses when said vehicle is moving over a predetermined part of its run.

5. Apparatus in accordance with claim 2 wherein said switching means includes an "off" position where all of said electrical components are disconnected and a plurality of active positions in which the different ones of said electrical components are shunted across respective transducers, and including a motor connected to drive said switching means through said positions, means for starting said motor at a desired point in the travel of said vehicle, and means for stopping said motor at said "off" position of said switching means at a later point in said vehicle travel.

6. Apparatus in accordance with claim 2 wherein at least one of said information transducers is replaced by a dummy, non-variable transducer which is connected in a desired subcarrier channel to normally give a steady "zero" output, whereby improper spurious signals appearing in the output of the entire system can be detected and allowance made therefor.

7. Apparatus in accordance with claim 2 including a receiver adapted to receive and detect said carrier wave to reproduce said subcarrier channels, a plurality of demodulator channels each connected to the output of said receiver, said demodulator channels being respectively tuned to accept the signal from a different one of said subcarrier channels and no other, each of said demodulator channels being adapted to convert its respective frequency modulated subcarrier signal into suitable current for driving an indicator in accordance with a function of the instantaneous frequency of said respective subcarrier signal, and recording means for preserving said data, as shown by said indicators, in relation to elapsed time.

8. In a radio telemetering system for transmitting data from a vehicle to a remote receiving station, the combination of means producing a single transmitted carrier wave from said vehicle, a plurality of subcarrier channels each having a different operating frequency and connected to feed a portion of said data into said carrier producing means for separable modulation thereof, an information transducer connected in each of said subcarrier channels and adapted to produce an electrical signal representative of a certain variable condition making up said portion of data, and a channel identifier-calibrator unit comprising a multiple pole, multiple position rotary switch, a resistor connected between the rotor of each switch pole and a common connection point with all of said transducers, at least one of the position of said switch being at an open terminal at each of said poles so that the rotor end of each of said resistors is open, conductive connecting means between the remainder of the switch terminals and each respective transducer so that each of said resistors is momentarily shunted across a different one of said transducers in a predetermined sequential manner as said switch is rotated, and means for rotating said switch as desired, the order of resistor shunting as said switch is rotating being different for each of said transducers, and the values of said resistors being each designed to give a different respective transducer output characteristic which corresponds to a known value of the particular portion of data to be transmitted from each transducer, whereby each subcarrier channel is identified and the transmitted data arriving at said receiving station when said switch is in its "open" position can be accurately calibrated throughout the entire range of system operation.

9. Apparatus in accordance with claim 8 wherein said transducers are bridge-type acceloromters, said connecting means being arranged to produce positive and negative identifying variations in cooperation with the action of said switch, and said resistors being respectively chosen to give variations amounting to approximately 25%, 50%, 75% and 100% of maximum accelerometer capacity.

10. Apparatus in accordance with claim 8 wherein said carrier producing means is amplitude modulated by the output of said subcarrier channels, said subcarrier channels are frequency modulated by their respective transducers, and said transducers are variable-resistance bridge networks, said resistors being shunted across various arms of said bridges, by said switch, to to alter the frequency output of said subcarrier channels.

11. Apparatus in accordance with claim 8 including an electric motor connected to rotate said switch, motor starting means arranged to be mechanically operated at a desired point in the travel of said vehicle, and motor stopping and braking means arranged to be mechanically operated at a later point in said vehicle travel, said motor stopping and braking means including position sensing means controlled by said switch to stop said motor only at said switch "open" position, whereby identification and calibration of said subcarrier channels is automatically provided at a certain position of said vehicle during a test run.

12. Apparatus in accordance with claim 11 wherein a disconnectable coupling is provided between said switch and the motor and braking means, and including a manual operating member for disconnecting said coupling and rotating said switch relative to said motor, whereby identification and calibration may be manually accomplished at any desired time.

13. In a radio telemetering system using a plurality of information transducers in separate circuits for converting desired information into electrical signals, identifying and calibrating means comprising a plurality of different valued electrical components each adapted to be momentarily connected to any of said transducers to produce a predetermined steady output from said circuits while said components are so connected, and switching means arranged to sequentially connect each of said electrical components to each of said transducers in a predetermined different order peculiar to each respective transducer, when said switching means is actuated, the values of said components each designed to give a respective circuit output corresponding to a different reference value of the particular information to be converted by said transducer.

14. In a radio telemetering system using a plurality of information transducers in separate circuits for converting desired data into electrical signals, identifying and calibrating means comprising a multiple pole, multiple position rotary switch, a resistor connected between the rotor of each switch pole and a common connection point with all of said circuits, at least one of the positions of said switch being an "off" position where the rotor end of each of said resistors is open, conductive connecting means between the various terminals of the remainder of switch positions and respective predetermined connections in each transducer circuit so that each of said resistors is momentarily shunted across a selected portion of a different one of said transducer circuits in a predetermined sequential manner as said switch is rotated, the order of resistor shunting as said switch is rotating being different but unchanging for each of said transducer circuits, and the values of said resistors each designed to give a different respective circuit output characteristic which is equivalent to a known value of the desired data to be converted by said transducers, for calibration purposes.

15. Apparatus in accordance with claim 14 wherein said transducers are variable resistance bridge networks, said resistors being shunted across various arms of said transducers to produce positive and negative bridge unbalance variations, when said switch is rotated.

16. Apparatus in accordance with claim 14 including an electric motor connected to rotate said switch, and a manual switch rotating member provided with indicator means for showing the positions occupied by said switch, said identifying and calibrating means and said motor being housed in a unit assembly separate from said transducers and having wiring provisions for leading to said transducer circuits.

17. Apparatus in accordance with claim 14 including an electric motor and brake assembly, a disconnectable coupling through which said assembly has a rotating connection with said switch, motor starting means arranged to be automatically operated at a predetermined time during system operation, motor stopping and braking means arranged to be automatically operated at a slightly later time, said motor stopping and braking means including position sensing means positively connected to rotate with said switch, to effect stopping of said motor only at said switch "off" position, and a manually operated switch member for disconnecting said coupling and rotating said switch relative to said motor.

18. In a radio telemetering system for transmitting data from a vehicle to a remote receiving station, the combination of a plurality of information transducers for converting desired dynamic conditions into electrical signals, a subcarrier oscillator having a different operating frequency connected to each of said transducers to be frequency modulated thereby in accordance with the condition of its respective transducer, a modulator and transmitter connected to the mixed outputs of said subcarrier oscillators for amplitude modulation of a high frequency carrier wave with the frequency modulated subcarriers, and subcarrier identifying and calibrating means connectable into said subcarrier oscillators as and when desired, said identifying and calibrating means arranged to produce a different known series of sequential signals in each subcarrier frequency channel at the output of said system, whereby each subcarrier channel, after demodulation, can be easily identified and furnished with calibration information for determining the true value of output indications therein.

WALDO G. HODSON.
WALTER E. PETERSON.

References Cited in the file of this patent

UNITED STATES PATENTS

| Number | Name | Date |
|---|---|---|
| 2,237,522 | Clark | Apr. 8, 1941 |
| 2,333,321 | Leathers | Nov. 2, 1943 |
| 2,407,308 | Lorenzen et al. | Sept. 10, 1946 |
| 2,489,253 | Andre | Nov. 29, 1949 |
| 2,496,148 | Butts | Jan. 31, 1950 |
| 2,498,306 | Stedman et al. | Feb. 21, 1950 |
| 2,534,841 | Wallace | Dec. 19, 1950 |
| 2,546,307 | Johnson et al. | Mar. 27, 1951 |
| 2,555,355 | MacGoerge | June 5, 1951 |